US008265586B2

(12) United States Patent
Lee et al.

(10) Patent No.: US 8,265,586 B2
(45) Date of Patent: Sep. 11, 2012

(54) APPARATUS AND METHOD FOR LOW-NOISE AMPLIFICATION IN A WIRELESS COMMUNICATION SYSTEM

(75) Inventors: Hee-Hyun Lee, Hwaseong-si (KR); Hoon-Tae Kim, Suwon-si (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 650 days.

(21) Appl. No.: 12/212,725

(22) Filed: Sep. 18, 2008

(65) Prior Publication Data

US 2009/0075623 A1    Mar. 19, 2009

(30) Foreign Application Priority Data

Sep. 19, 2007    (KR) .................. 10-2007-0095082

(51) Int. Cl.
*H04B 1/16* (2006.01)
(52) U.S. Cl. ........... 455/341; 455/296; 330/51; 330/149
(58) Field of Classification Search .................. 455/341, 455/296, 307, 84; 330/295, 149, 151, 51, 330/124 R
See application file for complete search history.

(56) References Cited

U.S. PATENT DOCUMENTS

| 5,148,117 | A  | * | 9/1992  | Talwar ........................... 330/151 |
| 6,313,702 | B1 | * | 11/2001 | Seino ............................ 330/149 |
| 6,781,467 | B2 | * | 8/2004  | Sun ............................... 330/295 |
| 6,906,601 | B2 | * | 6/2005  | Fayyaz .......................... 333/156 |
| 7,248,846 | B2 | * | 7/2007  | Kayano et al. ............. 455/127.3 |
| 7,359,678 | B2 | * | 4/2008  | Hayashi et al. ................. 455/84 |
| 7,639,075 | B2 | * | 12/2009 | Lin ................................ 330/51 |
| 7,894,788 | B2 | * | 2/2011  | Keehr et al. .................. 455/296 |
| 2008/0299932 | A1 | * | 12/2008 | Belogolovy et al. .......... 455/296 |
| 2009/0004991 | A1 | * | 1/2009  | Juang ........................... 455/307 |

* cited by examiner

*Primary Examiner* — Andrew Wendell
*Assistant Examiner* — Chung-Tien Yang
(74) *Attorney, Agent, or Firm* — Cha & Reiter, LLC

(57) ABSTRACT

A low-noise amplification apparatus and method in a receiver in a wireless communication system are provided, in which a main amplifier amplifies a received signal, a sub-amplifier amplifies a third-order harmonic component more strongly than a signal component in the received signal and cancels the third-order harmonic component by combining the amplified signal with the signal received from the main amplifier. A noise eliminator amplifies noise included in the received signal and eliminates the noise by combining the amplified noise with the signal received from the main amplifier or the signal received from the sub-amplifier.

21 Claims, 5 Drawing Sheets

APPARATUS AND METHOD FOR LOW-NOISE AMPLIFICATION IN A WIRELESS COMMUNICATION SYSTEM

CLAIM OF PRIORITY

This application claims the benefit of priority under 35 U.S.C. §119(a) from a Korean Patent Application filed in the Korean Intellectual Property Office on Sep. 19, 2007 and assigned Serial No. 2007-95082, the entire disclosure of which is hereby incorporated by reference in its entirety.

BACKGROUND OF THE INVENTION

1. Field of the Invention

The present invention generally relates to an apparatus and method for low-noise amplification in a wireless communication system. More particularly, the present invention relates to a low-noise amplification apparatus and method for selectively according to a radio channel status in a wireless communication system.

2. Description of the Related Art

In wireless communication systems, a receiver typically uses a Low Noise Amplifier (LNA) for amplifying the weak power of a received signal, while suppressing noise in the received signal. Therefore, the requirements for the LNA include a low noise factor, a high gain, and safety.

The receiver typically controls the gain of the LNA according to the status of a radio channel by changing a voltage applied to the LNA. For example, the receiver controls the LNA according to a radio channel environment as illustrated in FIG. 1.

FIG. 1 is a flowchart illustrating a conventional procedure for operating an LNA in a wireless communication system. The following description is made on the assumption that a first threshold (threshold 1) is larger than a second threshold (threshold 2) and threshold 2 is larger than a minimum sensitivity.

Referring to FIG. 1, the receiver measures the Received Signal Strength Indication (RSSI) of a radio channel in step 101.

In step 103, the receiver compares the RSSI with threshold 1 to ascertain whether the RSSI is greater than Threshold 1 in order to determine an LNA operation scheme according to a radio channel environment. Threshold 1 can be 80 dBm, for example.

If the RSSI is larger than threshold 1, in step 105 the receiver sets the LNA to bypass mode, considering that the radio channel is sufficiently strong by bearing greater than the Threshold 1. That is, the receiver controls a received signal to bypass the LNA.

On the contrary, if the RSSI is equal to or less than Threshold 1, at step 107 the receiver compares the RSSI with threshold 2 to ascertain whether the RSSI is larger than Threshold 2, which is essentially a determination as to whether Threshold 1 is greater than or equal to the RSSI, and whether the RSSI is greater than Threshold 2.

If the RSSI is larger than threshold 2, at step 109 the receiver sets the gain of the LNA to a medium gain, considering that the radio channel is at an intermediate strength.

On the other hand, if the RSSI is equal to or less than threshold 2 in step 107, the receiver compares the RSSI with the minimum sensitivity in step 111 to determine if the RSSI is larger than the minimum sensitivity. The minimum sensitivity is a minimum requirement of the radio channel status for the receiver to decode a signal.

If the RSSI is larger than the minimum sensitivity, at step 113 the receiver sets the gain of the LNA to a high gain, considering that the radio channel is relatively weak (lower than both Threshold 1 and Threshold 2).

If the RSSI is equal to or less than the minimum sensitivity, at step 115 the receiver determines that it cannot receive the signal because of a bad radio channel status.

Then, the receiver ends the algorithm.

As described above, the receiver amplifies a received weak signal and suppressing its noise, by using a different LNA operation scheme depending on the RSSI of the radio channel. However, when the receiver is affected by interference from a neighbor channel, the LNA circuit becomes saturated due to an interference-caused third-order harmonic frequency.

Accordingly, the LNA cancels the third-order harmonic from the received signal by use of a main amplifier and a sub-amplifier as illustrated in FIG. 2.

FIG. 2 is a circuit diagram of a conventional LNA in the wireless communication system.

Referring to FIG. 2, an LNA 200 includes a main amplifier 210 and a sub-amplifier 220. The main-amplifier 210 amplifies a signal received through a base (A) and outputs the amplified signal to a collector (B). The signal output from the collector B has the inverted phase of the signal input to the base A.

The sub-amplifier 220 amplifies a third-order harmonic component more strongly than a signal component in the same signal as a signal input to the main amplifier 210. The sub-amplifier 220 uses two transistors 221 and 223 to avoid inversion of the phase of the signal.

Thus, as shown in the conventional circuit in FIG. 2, the LNA 200 combines a signal with an inverted phase amplified by the main amplifier 210 with a signal with the phase kept intact amplified by the sub-amplifier 220, thereby canceling the third-order harmonic component.

A gain controller 230 controls the gain of the LNA 200 according to a radio channel environment. If the radio channel is weak, the gain controller 230 sets the resistance of a resistor $R_0$ to a high value so that the LNA 200 gets the highest gain. If the radio channel is intermediate in strength, the gain controller 230 sets the resistance to a low value so that the LNA 200 gets a medium gain.

As described above, the LNA shown in FIG. 2 can suppress noise by canceling a third-order harmonic component by use of the main amplifier and the sub-amplifier. Yet, the signal component is also attenuated when the third-order harmonic component is canceled through combination of the signals output from the main amplifier and the sub-amplifier. As a consequence, the Signal-to-Noise Ratio (SNR) of the LNA decreases.

SUMMARY OF THE INVENTION

An aspect the present invention is to provide an apparatus and method for reducing an SNR decrease of an LNA in a wireless communication system.

Another exemplary aspect of the present invention provides a low-noise amplification apparatus and method for reducing an SNR decrease by eliminating noise and maintaining high linearity through third-order harmonic cancellation in a wireless communication system.

A further exemplary aspect of the present invention provides an apparatus and method for performing low-noise amplification adaptively according to a radio channel environment by configuring a third-order harmonic cancellation module and a noise elimination module independently in a wireless communication system.

In accordance with an exemplary aspect of the present invention, there is provided a low-noise amplification apparatus of a receiver in a wireless communication system, in which a main amplifier amplifies a received signal, a sub-amplifier amplifies a third-order harmonic component more strongly than a signal component in the received signal and cancels the third-order harmonic component by combining the amplified signal with the signal received from the main amplifier, and a noise eliminator amplifies noise included in the received signal and eliminates the noise by combining the amplified noise with the signal received from the main amplifier or the signal received from the sub-amplifier.

In accordance with yet another exemplary aspect of the present invention, there is provided a method for operating an LNA in a receiver in a wireless communication system, in which a radio channel environment is determined, it is determined whether there is neighbor channel interference, and a received signal is amplified by selectively activating a main amplifier, a sub-amplifier, and a noise eliminator according to the radio channel environment and the presence or absence of the neighbor channel interference.

BRIEF DESCRIPTION OF THE DRAWINGS

The above features and advantages of certain exemplary embodiments of the present invention will become more apparent from the following detailed description taken in conjunction with the accompanying drawings, in which.

Throughout the drawings, the same drawing reference numerals will be understood to refer to the same elements, features and structures.

DETAILED DESCRIPTION

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions may be omitted for clarity and conciseness so as not to obscure appreciation b a person of ordinary skill in the art of the subject matter of the present invention.

Exemplary embodiments of the present invention are intended to provide a low-noise amplification technique for reducing an SNR decrease, while maintaining high linearity at a receiver in a wireless communication system. Herein, linearity refers to the difference between a signal component and a third-order harmonic component. Hence, as the difference between the signal component and the third-order harmonic component becomes wide, the receiver gets a higher linearity.

Figure 1:
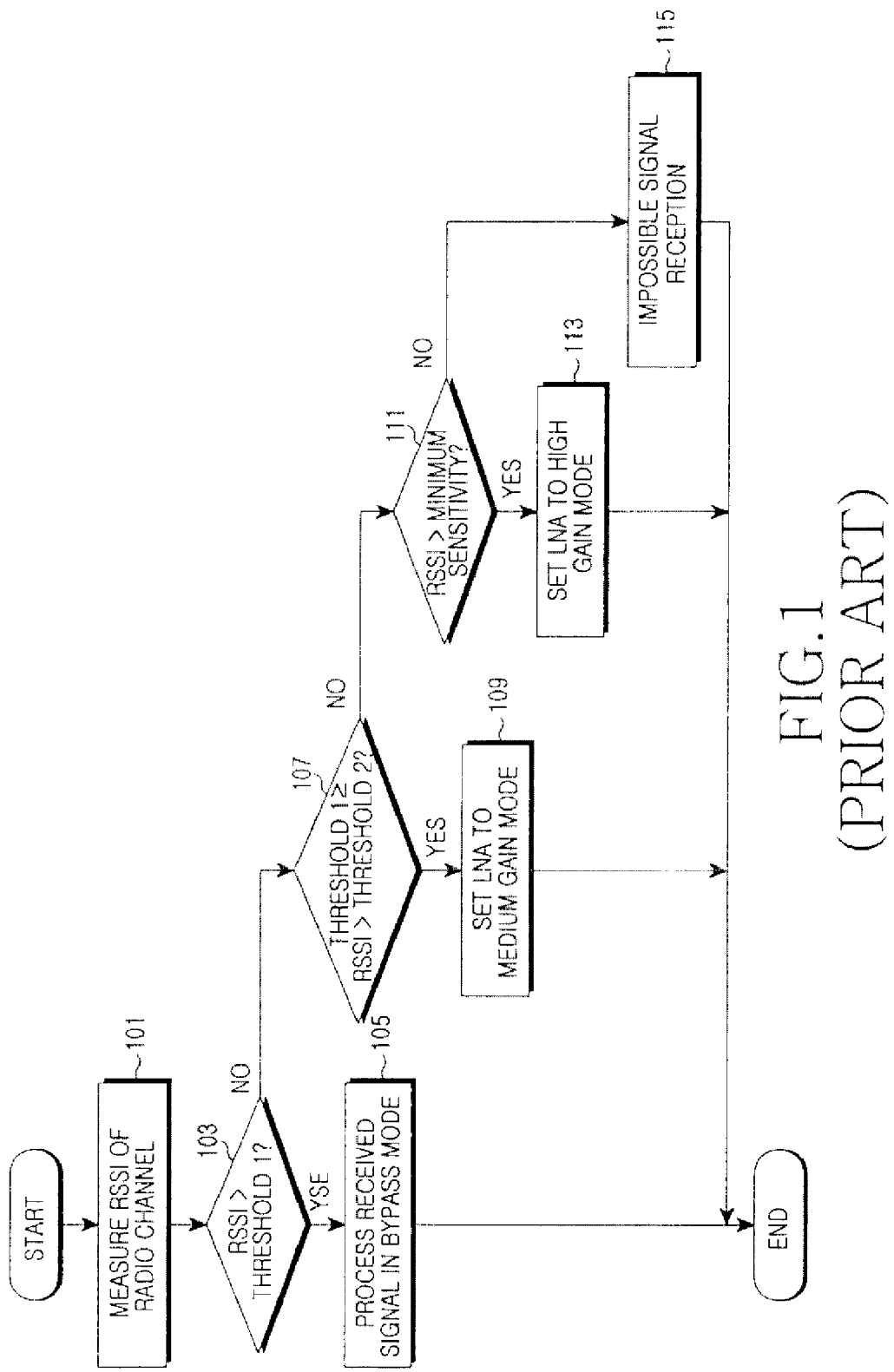
FIG. 1 is a flowchart illustrating a conventional procedure for operating an LNA in a wireless communication system.
Figure 2:
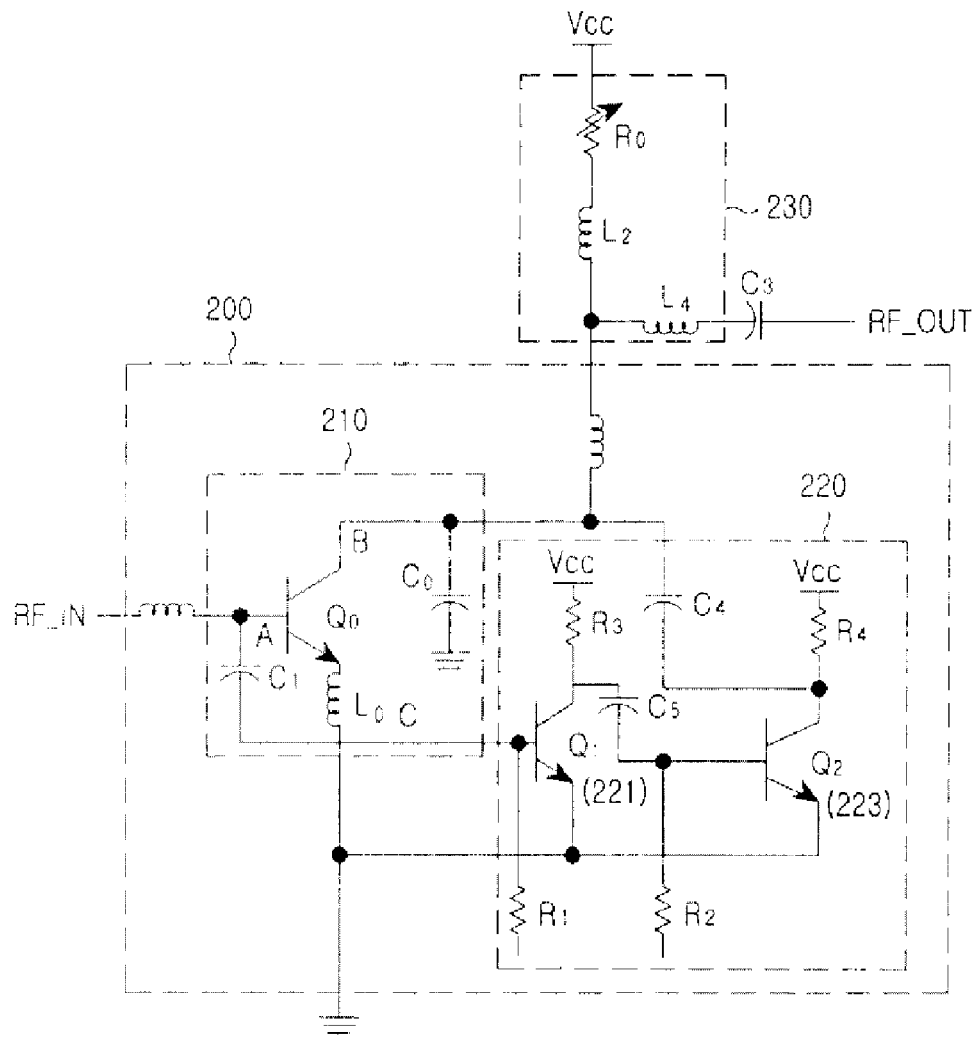
FIG. 2 is a circuit diagram of a conventional LNA in the wireless communication system.
Figure 3:
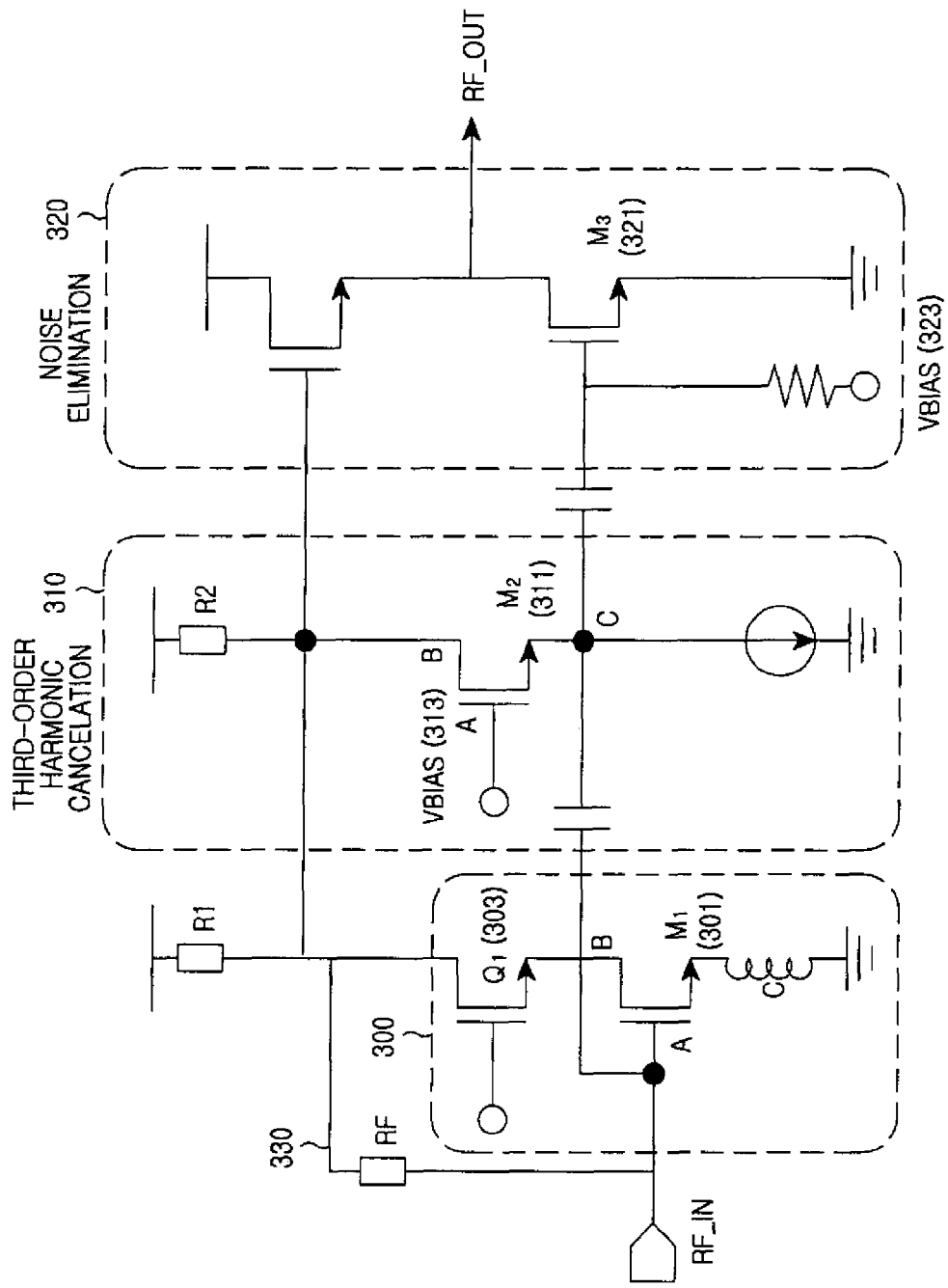
FIG. 3 is a circuit diagram of an LNA in a wireless communication system according to an exemplary embodiment of the present invention.

According to an exemplary aspect of the present invention, in order to reduce an SNR decrease while maintaining high linearity, a receiver low-noise-amplifies a received signal by an LNA having the configuration illustrated in FIG. 3 in a wireless communication system.

FIG. 3 is a circuit diagram of an LNA in a wireless communication system according to an exemplary embodiment of the present invention. Referring now to FIG. 3, the LNA includes a main amplifier 300, a sub-amplifier 310, and a noise eliminator 320.

The main amplifier 300 has a first transistor 301 ($M_1$) and a second transistor 303 ($Q_1$).

The first transistor 301 amplifies a signal received through a gate (A) and outputs the amplified signal to a drain (B). The signal output from the drain B has the inverted phase of the signal input to the gate A. For example, when the first transistor 301 amplifies a highly linear signal 401 (illustrated in FIG. 4) as indicated by signal amplifier 403, the output of the first transistor 301 has a phase inverted from the phase of the signal 401. This amplified signal includes a third-order harmonic component 411 caused by neighbor channel interference.

Therefore, a signal output from the main amplifier 300 has the inverted phase of its input signal due to the operation of the first transistor 301. However, a feedback channel 330 keeps the phase of the noise included in the signal output from the main amplifier 300 intact without inversion.

The second transistor 303 isolates the main amplifier 300 from the sub-amplifier 310. The sub-amplifier 310 amplifies the same signal as the input signal of the first transistor 301 of the main amplifier 300 so that the signal has a low linearity. That is, the sub-amplifier 310 amplifies a rate of amplification of a third-order harmonic component greater than a rate of amplification of a signal component in the received signal. To achieve the low linearity, the sub-amplifier 310 supplies a bias current to a third transistor 311 ($M_2$) to control the weakest current.

Still referring TO FIG. 3, sub-amplifier 310 receives an input signal through a source (C) of the third transistor 311 to prevent the phase inversion of the amplified received signal. For example, if the third transistor 311 receives a highly linear signal 401 illustrated in FIG. 4 through the source, it amplifies a third-order harmonic component 413 to a higher power level than a signal component of the signal 401, as indicated by reference numeral 405 in FIG. 4. Notably, the phase of the signal output from the third transistor 311 is not inverted.

Figure 4:
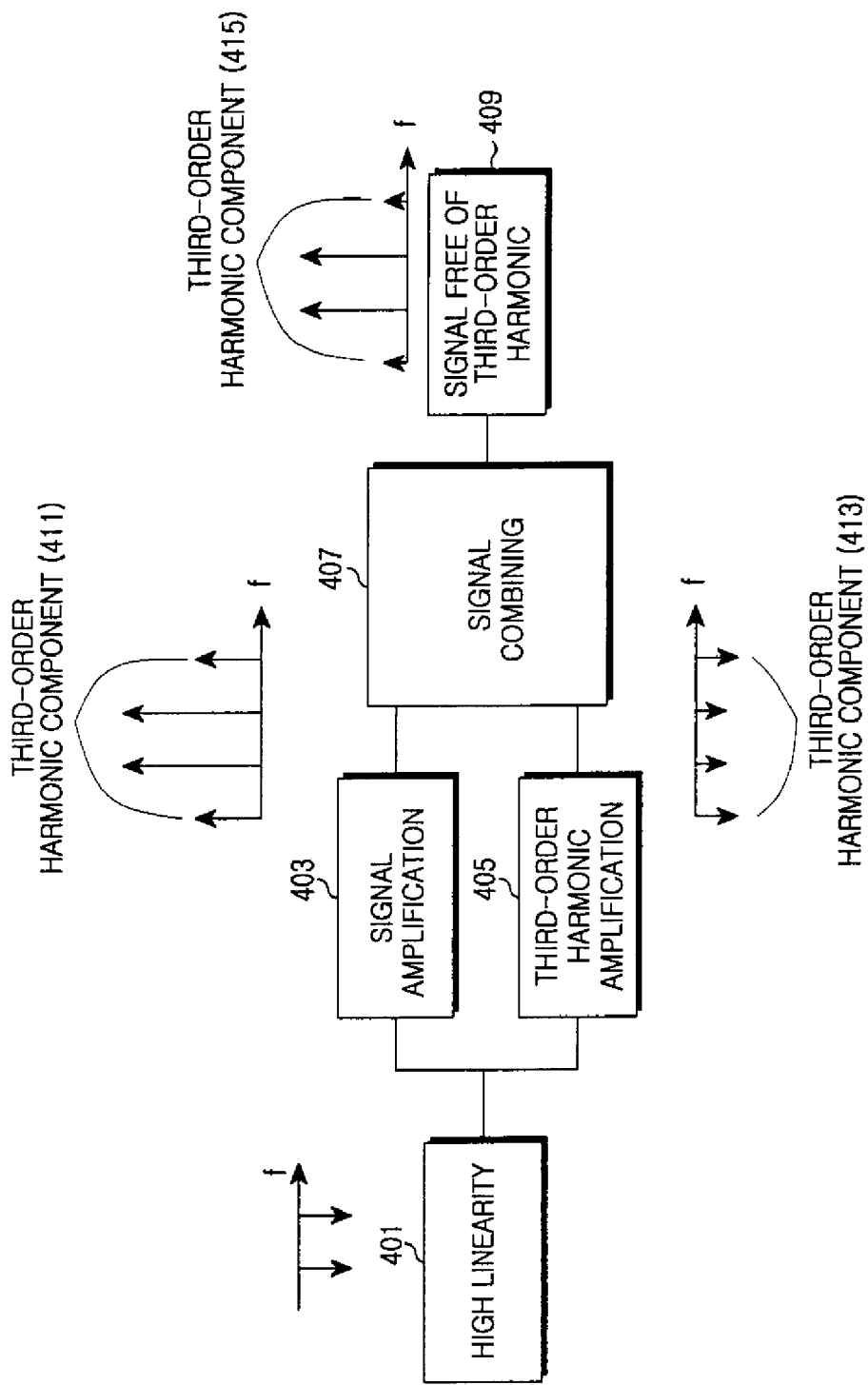
FIG. 4 is a block diagram illustrating a third-order harmonic cancellation operation in the LNA in the wireless communication system according to an exemplary embodiment of the present invention.

Hence, according to this exemplary aspect of the present invention, the LNA combines the amplified signal with an inverted phase output from the main amplifier 300 with the amplified signal with a non-inverted phase output from the sub-amplifier 310, thereby canceling the third-order harmonic component. As illustrated in FIG. 4, for example, when the main amplifier 300 and the sub-amplifier 310 amplify the highly linear signal 401, the LNA can cancel the third-order harmonic signal as indicated by reference numeral 409 by combining the signals amplified by the main amplifier 300 and the sub-amplifier 310 as indicated by reference numeral 407.

The noise eliminator 320 monitors noise in the signal input to the main amplifier 300. The noise amplifier 320 amplifies the monitored noise through a fourth transistor 321 ($M_3$). The amplified noise has a phase inverted from the phase of the pre-amplification noise.

Then, the LNA proceeds to eliminate the noise from the amplified received signal by combining noise with a phase kept intact by the feedback channel 330 in the main amplifier 300 with the noise with the phase inverted by the noise eliminator 320. That is, the LNA can reduce an SNR decrease through the noise elimination of the noise eliminator 320.

When the sub-amplifier 310 is activated, the LNA eliminates the noise from the amplified received signal by combining the signal output from the sub-amplifier 310 with the noise with the phase inverted by the noise eliminator 320. On the other hand, if the sub-amplifier 310 is inactive, according to the present invention, the LNA eliminates the noise from the amplified received signal by combining the signal output from the main amplifier 300 with the noise with the phase inverted by the noise eliminator 320.

As described above, the LNA can eliminate the third-order harmonic component and the noise component from the signal amplified by the main amplifier 300 using the sub-amplifier 310 and the noise eliminator 320. The LNA can turn on/off each module independently by controlling bias currents 313 and 323 of the sub-amplifier 310 and the noise eliminator 320. While not shown, the LNA controls the bias currents 313 and 323 according to a radio channel by use of a bias controller.

Figure 5:
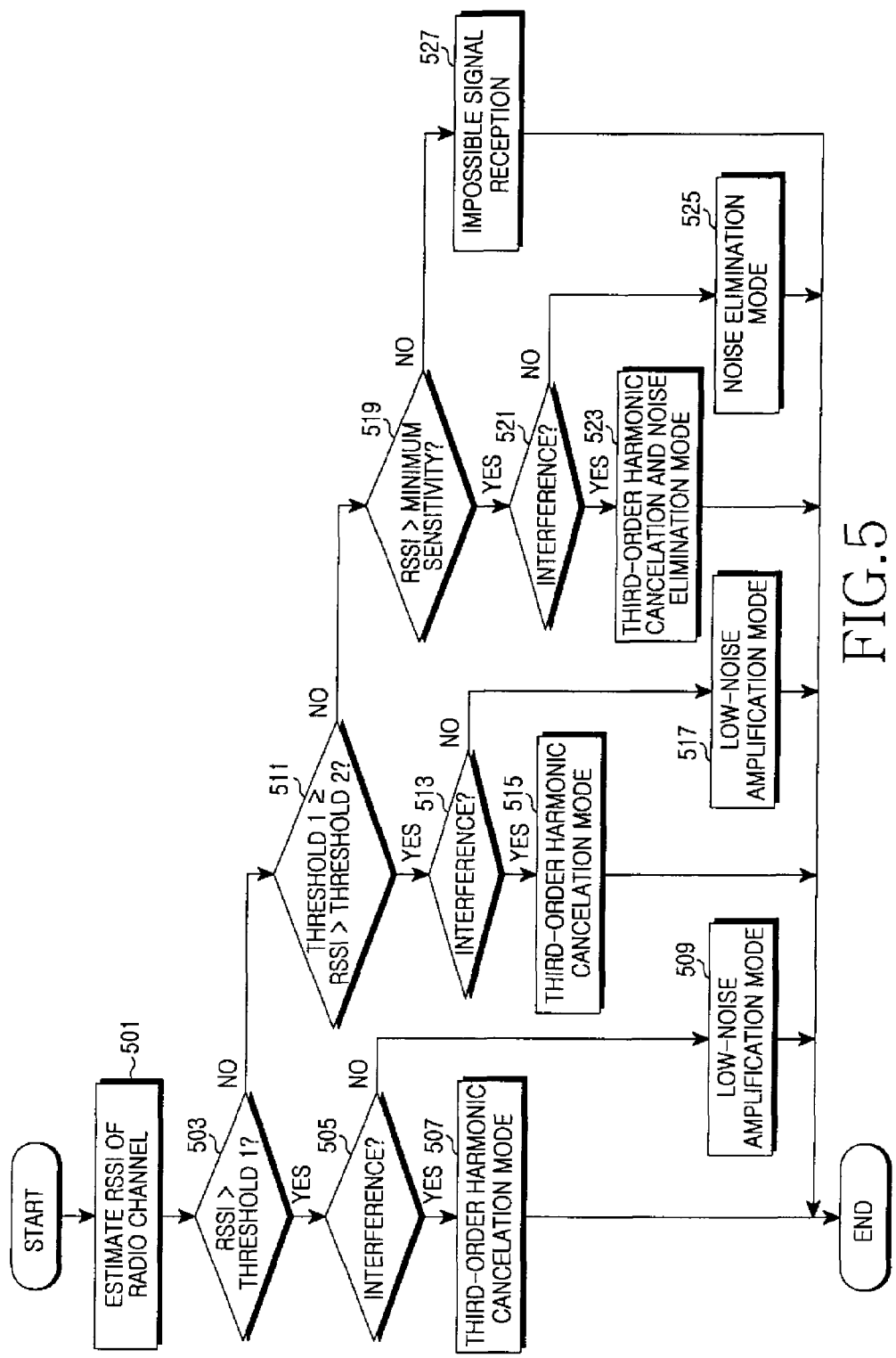
FIG. 5 is a flowchart illustrating a procedure for operating the LNA in the wireless communication system according to an exemplary embodiment of the present invention.

Thus, the LNA can operate adaptively according to a radio channel environment by controlling the bias currents 313 and 323 of the sub-amplifier 310 and the noise eliminator 320, as illustrated in FIG. 5.

FIG. 5 is a flowchart illustrating an exemplary procedure for operating the LNA in the wireless communication system according to an exemplary embodiment of the present invention. The following description is made on the assumption that a first threshold (threshold 1) is larger than a second threshold (threshold 2) and threshold 2 is larger than a minimum sensitivity.

Referring now to FIG. 5, the receiver measures the RSSI of a radio channel in step 501. In step 503, the receiver compares the RSSI with threshold 1 in order to determine an LNA operation scheme according to a radio channel environment. Threshold 1 can be 80 dBm, for example.

If the RSSI is larger than threshold 1, the receiver determines whether there is neighbor channel interference in step 505.

In the presence of the neighbor channel interference, at step 507, the receiver controls the main amplifier and the sub-amplifier of the LNA to be activated in order to cancel a third-order harmonic component because the radio channel is strong and includes interference. In the case of a strong radio channel, the receiver controls the noise eliminator of the LNA to be deactivated because an SNR requirement for signal demodulation can be satisfied without eliminating noise.

In the absence of the neighbor channel interference in step 505, the receiver controls only the main amplifier of the LNA to be activated because the radio channel is strong and free of interference in step 509. In the case of a strong radio channel, the receiver controls the noise eliminator of the LNA to be deactivated because an SNR requirement for signal demodulation can be satisfied without eliminating noise. Also, when there is no neighbor channel interference, the received signal is free of a third-order harmonic component and thus the receiver controls the sub-amplifier of the LNA to be deactivated.

In yet another example, when the radio channel is strong, the receiver may not low-noise-amplify the received signal, considering that the received signal is sufficiently strong in step 509. That is, the receiver can control the received signal to bypass the LNA. Herein, the receiver controls the main amplifier, the sub-amplifier, and the noise eliminator of the LNA to be deactivated.

Still referring to the flowchart in FIG. 5, if the RSSI is equal to or less than threshold 1, the receiver compares the RSSI with threshold 2 in step 511.

If the RSSI is larger than threshold 2, then at step 513 the receiver monitors the presence of neighbor channel interference. In the presence of neighboring channel interference, the receiver controls the main amplifier and the sub-amplifier of the LNA to be activated in order to cancel a third-order harmonic component because the radio channel is intermediate in strength and includes interference in step 515. In the case where a radio channel is intermediate in strength, the receiver controls the noise eliminator of the LNA to be deactivated because an SNR requirement for signal demodulation can be satisfied without eliminating noise.

When there is no neighboring channel interference in step 513, the receiver at step 517 controls only the main amplifier of the LNA to be activated because the radio channel is intermediate in strength and free of interference. In the case where a radio channel is intermediate in strength, the receiver controls the noise eliminator of the LNA to be deactivated because an SNR requirement for signal demodulation can be satisfied without eliminating noise. Also, when there is no neighbor channel interference, the received signal is free of a third-order harmonic component and thus the receiver controls the sub-amplifier of the LNA to be deactivated.

On the other hand, at step 511, if the RSSI is equal to or less than threshold 2, the receiver at step 519 compares the RSSI with the minimum sensitivity. The minimum sensitivity is a minimum requirement of the radio channel status for the receiver to decode a signal.

If it is determined at step 519 that the RSSI is larger than the minimum sensitivity, the receiver monitors the presence of neighboring channel interference in step 521.

At step 521, in the presence of the neighbor channel interference, the receiver at step 523 controls the main amplifier, the sub-amplifier, and the noise eliminator of the LNA to be activated in order to cancel a third-order harmonic component because the radio channel is weak and includes interference.

In the absence of the neighbor channel interference in step 521, the receiver activates the main amplifier and the noise eliminator of the LNA because the radio channel is weak and free of interference in step 525. In the case where the radio channel is free of neighbor channel interference, the received signal does not include a third-order harmonic component and thus the receiver deactivates the sub-amplifier of the LNA.

If the RSSI is equal to or less than the minimum sensitivity in step 519, the receiver determines at step 527 that it cannot receive the signal because of a bad radio channel status.

Then, the receiver ends the algorithm.

As is apparent from the above description, the present invention advantageously reduces an SNR decrease, while maintaining high linearity because a received signal is low-noise-amplified at an LNA by selectively activating a third-order harmonic cancellation module or a noise-eliminating module of the LNA according to a radio channel environment in a receiver of a wireless communication system. Also, the present invention increases power efficiency through adaptive activation of each module according to the radio channel environment.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A low-noise amplification apparatus of a receiver in a wireless communication system, comprising:
   a main amplifier for amplifying a received signal;
   a sub-amplifier for amplifying rate of amplification of a third-order harmonic component greater than rate of amplification of a signal component in the received signal and canceling the third-order harmonic component by combining the amplified third-order harmonic component signal with the signal received from the main amplifier; and
   a noise eliminator for amplifying noise included in the received signal and eliminating the noise by combining the amplified noise with the signal received from the main amplifier or the signal received from the sub-amplifier,
   wherein the signal component is a fundamental wave component of the received signal, and wherein the main amplifier, the sub-amplifier, and the noise eliminator are selectively activated during reception of the received signal to operate adaptively according to a state of the confirmed radio channel environment and the presence or absence of the neighbor channel interference.

2. The low-amplification apparatus of claim 1, wherein the main amplifier outputs a signal component with an inverted phase, a third-order harmonic component with an inverted phase, and noise with a non-inverted phase by amplifying the received signal.

3. The low-amplification apparatus of claim 1, wherein the sub-amplifier receives the received signal through a source of a transistor and amplifies the received signal so that the phase of the received signal is not inverted.

4. The low-amplification apparatus of claim 1, wherein the noise eliminator amplifies the noise included in the received signal to the same power level as noise amplified by the main amplifier.

5. The low-amplification apparatus of claim 1, wherein when the sub-amplifier is deactivated, the noise eliminator eliminates the noise by combining the signal received from the main amplifier with the amplified noise, and when the sub-amplifier is activated, the noise eliminator eliminates the noise by combining the signal received from the sub-amplifier with the amplified noise.

6. The low-amplification apparatus of claim 1, further comprising a bias controller for controlling the sub-amplifier and the noise eliminator to turn on or off independently by controlling bias currents of the sub-amplifier and the noise eliminator.

7. The low-amplification apparatus of claim 6, wherein the bias controller controls the bias currents of the sub-amplifier and the noise eliminator according to a radio channel environment.

8. The low-amplification apparatus of claim 6, wherein the bias controller controls the bias currents of the sub-amplifier and the noise eliminator according to a Received Signal Strength Indication (RSSI) and the presence or absence of interference.

9. The low-amplification apparatus of claim 6, wherein in the presence of a neighbor channel interference, the bias controller controls the bias current of the sub-amplifier to activate the sub-amplifier, and in the absence of neighbor channel interference, the bias controller controls the bias current of the sub-amplifier to deactivate the sub-amplifier.

10. The low-amplification apparatus of claim 6, wherein the bias controller controls the bias current of the noise eliminator to activate the noise eliminator, only when a radio channel received signal strength is below a predetermined value.

11. A method for operating a Low-Noise Amplifier (LNA) in a receiver in a wireless communication system, comprising:
   confirming a radio channel environment;
   confirming whether there is a neighbor channel interference; and
   amplifying a received signal by selectively activating a main amplifier, a sub-amplifier, and a noise eliminator during reception of the received signal to operate adaptively according to a state of the confirmed radio channel environment and the presence or absence of the neighbor channel interference;
   wherein the main amplifier amplifies a received signal,
   wherein the sub-amplifier amplifies a rate of amplification of a third-order harmonic component greater than the rate of amplification of a signal component in the received signal and canceling the third-order harmonic component by combining the amplified third-order harmonic component signal with the signal received from the main amplifier, and
   wherein the noise eliminator amplifies noise included in the received signal and eliminating the noise by combining the amplified noise with the signal received from the main amplifier or the signal received from the sub-amplifier.

12. The method of claim 11, wherein the radio channel environment confirmation comprises:
   measuring a Received Signal Strength Indication (RSSI) using a signal received from a serving station;
   determining that a radio channel is strong, if the RSSI is larger than a first threshold;
   determining that the radio channel is intermediate in strength, if the RSSI is equal to or less than the first threshold and larger than a second threshold; and
   determining that the radio channel is weak, if the RSSI is equal to or less than the second threshold and larger than a minimum sensitivity required for signal decoding.

13. The method of claim 11, wherein the amplification comprises:
   amplifying the received signal by activating the main amplifier, if a radio channel is strong in the radio channel environment and there is neighbor channel interference; and
   canceling a third-order harmonic component from the amplified received signal by activating the sub-amplifier.

14. The method of claim 11, wherein the amplification comprises amplifying the received signal by activating the main amplifier, if a radio channel is strong in the radio channel environment and there is not neighbor channel interference.

15. The method of claim 11, wherein the amplification comprises:
   bypassing the received signal without low-noise amplification by deactivating the main amplifier, the sub-amplifier, and the noise eliminator, if a radio channel is strong in the radio channel environment and there is not neighbor channel interference.

16. The method of claim 11, wherein the amplification comprises:
   amplifying the received signal by activating the main amplifier, if a radio channel is intermediate in strength in the radio channel environment and there is neighbor channel interference; and
   canceling a third-order harmonic component from the amplified received signal by activating the sub-amplifier.

17. The method of claim 11, wherein the amplification comprises:
   amplifying the received signal by activating the main amplifier, if a radio channel is intermediate in strength in the radio channel environment and there is no neighbor channel interference.

18. The method of claim 11, wherein the amplification comprises:
   amplifying the received by activating the main amplifier, if a radio channel is weak in the radio channel environment and there is neighbor channel interference; and
   canceling a third-order harmonic component from the amplified received signal by activating the sub-amplifier and the noise eliminator.

19. The method of claim 11, wherein the amplification comprises:
   amplifying the received signal by activating the main amplifier, if a radio channel is weak in the radio channel environment and there is not neighbor channel interference; and
   eliminating a noise component from the amplified received signal by activating the noise eliminator.

20. The low-amplification apparatus of claim 1, wherein the main amplifier amplifies the received signal and outputs the received signal as a phase-inverted output, said main amplifier having a feedback channel outputting noise that is kept intact without phase inversion.

21. The method of claim 11, wherein the amplifying of the received signal is output as a phase-inverted output, and said main amplifier outputs noise through a feedback channel in which the noise is kept intact without phase inversion.

* * * * *